Patented Aug. 29, 1950

2,520,338

UNITED STATES PATENT OFFICE 2,520,338

AZO COMPOUNDS CONTAINING CARBOXYL AND CYANO GROUPS

James A. Robertson, Wilmington, Del., assignor to E. I. du Pont de Nemours & Company, Wilmington, Del., a corporation of Delaware No Drawing. Application June 27, 1947, Serial No. 757,682

4 Claims. (Cl. 260—192)

This invention relates to new aliphatic azo compounds containing carboxyl and nitrile groups and to the use thereof in the addition polymerization of polymerizable organic compounds.

Compounds containing directly-linked oxygen atoms, such as benzoyl and other peroxides have been widely used as polymerization catalysts. They provide a source of oxygen which may change the properties of the polymer obtained, for example, by discoloration, oxidation of added dyestuffs, and insolubilization.

A new class of catalysts has been described in Hunt U. S. Patent No. 2,471,959, which issued May 31, 1949, on an application which was a continuation-in-part of abandoned application Serial Number 655,015, filed March 16, 1946, which are advantageous in that they do not promote discoloration and do not provide a source of oxygen for oxidation of added dyestuffs or insolubilization. However, the aliphatic azo compounds specifically disclosed in said application Serial Number 655,015 are not water-soluble and do not readily give dispersions of polymeric materials when polymerizations are carried out in the presence of water. For many applications, polymer dispersions in water are of advantage.

This invention has as an object the preparation of a new class of azonitriles. A further object is the preparation of water-soluble addition polymerization catalysts. Other objects will appear hereinafter.

Broadly speaking, these objects are accomplished by the invention of carboxyl-containing azonitriles and their salts. More specifically the azo compounds of this invention are those in which at least one of the nitrogens in the azo group (—N=N—) is attached to a tertiary carbon atom which has attached thereto a nitrile group and a hydrocarbon radical containing, as a substituent, a carboxyl group as such or in the form of one of its salts, i. e. a group —COOY where Y is a monovalent cation. The nature of the radical to which the remaining nitrogen of the azo group is attached is not critical but preferably it is the same as that attached to the other azo nitrogen.

The azo compounds of the present invention can be prepared by treating an oxo-carbonyl compound which also contains a carboxylic group, preferably as a water-soluble salt, with hydrazine followed by reaction with hydrogen cyanide. The resultant hydrazo compound can be oxidized with chlorine or bromine to the desired carboxyl-containing azonitrile (or its salt).

The following examples, in which the parts given are by weight, further illustrate the principles involved in this invention. Example I shows a representative azonitrile. The subsequent examples illustrate the use of the compounds in the polymerization of ethylenically unsaturated compounds.

Example I

A 25% aqueous solution of 138 parts of sodium levulinate was mixed with 25 parts of hydrazine hydrate and the solution heated on a steam bath for 6 hours. The mixture was cooled and treated with 80 parts of liquid hydrogen cyanide and was allowed to stand about 16 hours at room temperature. Excess hydrogen cyanide was removed by bubbling a stream of nitrogen through the solution. The solution was then treated with a stream of chlorine gas until halogen was no longer absorbed. The solid which formed was collected on a filter and purified by dissolving in aqueous sodium hydroxide followed by precipitation by dilute hydrochloric acid. After drying in a vacuum desiccator, the solid alpha,alpha'- azobis(alpha-methyl - gamma-carboxybutyronitrile) obtained weighed 92 parts corresponding to a 66% yield. The azonitrile melted at 120–123° C. with dec. and had the following analysis: Calculated for $C_{12}H_{16}N_4O_4$: C, 51.4; H, 5.7; N, 20.0; neutral equivalent, 140. Found: C, 51.3; H, 5.7; N, 20.4; neutral equivalent 141.5.

Example II

A container was charged with 50 parts of vinyl acetate, 150 parts of water, 0.5 parts of potassium monoacid phosphate, 1.5 parts of sodium dodecylsulfate and 0.5 parts of alpha,alpha' - azobis(alpha-methyl - gamma - carboxybutyronitrile). The container was closed and heated with rocking in a water bath for 40 hours at 40° C. Unreacted monomer was removed from the resulting polyvinyl acetate dispersion by distillation with steam and the polymer was coagulated with salt solution, washed thoroughly with water, and dried by milling at 140–150° C. on a rubber mill. There was obtained 37 parts corresponding to a 74% yield of polymer which had a relative viscosity of 1.609 in chloroform at a concentration of 0.1 g./100 ml. of solution at 25° C. The polymer prepared with the azonitrile catalyst dissolved readily in hot methanol to give solutions free of gel while comparable polymers prepared with ammonium persulfate as the catalyst dissolved with difficulty and gave solutions containing many gel particles. During the milling operation, polymers prepared with ammonium persulfate catalyst became dark red whereas the polymer prepared with the azonitrile as the catalyst did not become highly colored.

*Example III*

A vessel was charged with 20 parts of acrylonitrile, 265 parts of water and 0.17 parts of alpha,alpha'- azobis(alpha-methyl-gamma - carboxybutyronitrile) and the vessel was flushed with nitrogen and closed. After heating at 60° C. for 20 hours in a water bath, the vessel was opened and the polymer was isolated by filtration. There was obtained 7.7 parts of polymeric acrylonitrile which had a relative viscosity of 1.619 in dimethylformamide at a concentration of 0.1 g./100 ml. of solution.

*Example IV*

In a pressure resistant stainless steel vessel capable of containing 400 parts of water was placed 80 parts of benzene and 0.1 part of alpha,alpha'-azobis(alpha - methyl - gamma - carboxybutyronitrile). The vessel was flushed with nitrogen, the nitrogen was evacuated and the vessel was pressured to 400 atmospheres with ethylene. The reaction vessel with contents was heated at 120° C. for 10 hours while the ethylene pressure was maintained at 840–915 atmospheres. The reactor was cooled, bled of excess ethylene, and opened. The polymer was dried by milling at 140° C. on a rubber mill. There was thus obtained 14 parts of polyethylene which had relative viscosity of 1.140 as determined in xylene at 85° C. and a concentration of 0.125 g./100 ml. of solution. The polymer had a tensile strength of 3310 lbs./sq. in. with an elongation at break of 720% and a bending modulus of 31,000 lbs./sq. in.

The present invention is generic to carboxyl-containing azonitriles and in particular it is generic to azo compounds in which at least one of the nitrogens of the azo, —N=N—, group is attached to a tertiary carbon which has attached thereto a nitrile group and a hydrocarbon radical containing, as a substituent, a carboxyl group as such or in the form of one of its salts, i. e. a group —COOY where Y is a monovalent cation. The nature of the radical to which the remaining nitrogen of the azo group is attached is not critical but preferably it is the same as that attached to the other azo nitrogen. Preferably the two radicals attached to the azo, —N=N—, group are, except for the, —CN and —COOY groups, hydrocarbon.

The azonitriles of this invention contain the group COOY, where Y is a monovalent cation. Although the azonitrile compounds containing a carboxylic acid group, i. e. where Y is H, are usually sufficiently water-soluble to serve as polymerization catalysts in water systems, it is preferred from the standpoint of water-solubility that water-soluble salts of these compounds be used, even though they are generally somewhat less active as catalysts. The salts are preferably the alkali metal and ammonium salts including the sodium, lithium, potassium and quaternary ammonium salts, e. g. the tetramethyl ammonium salt.

Particularly useful are the azonitriles in which both azo nitrogens are attached to aliphatic carbons and the caboxyl group is attached to a carbon at least 3 carbons removed from the azo nitrogen. Such compounds can be represented by the formula

RHC(COOY)CH$_2$C(R$_1$)(CN)N=
    NC(CN)(R$_1$)CH$_2$C(COOY)HR where Y is a monovalent cation, e. g. hydrogen, an alkali metal or the ammonium group, R$_1$ is an organic radical preferably a hydrocarbon radical of 1–6 carbons, and the R is hydrogen or a hydrocarbon radical of 1–6 carbons. The invention is generic to compounds of this formula.

Specific examples of such compounds are alpha,alpha'-azobis(alpha - methyl - gamma - carboxybutyronitrile), alpha,alpha' - azobis(alpha-gamma,gamma-trimethyl - gamma - carboxybutyronitrile), alpha,alpha'-azobis(alpha-methyl-gamma - phenyl - gamma-carboxybutyronitrile), alpha,alpha'-azobis(alpha-propyl - gamma - carboxybutyronitrile). In general the more useful azonitriles have organic groups of from 6–12 carbons attached to each of the azo nitrogens.

These compounds can be prepared by the following steps: (a) treatment of an alkali salt of the carboxyl-containing ketone with hydrazine in aqueous medium to form the azine, (b) treatment of the resultant azine in aqueous medium with hydrogen cyanide to form the corresponding hydrazonitrile, and (c) oxidation of the hydrazonitrile with chlorine or bromine to give the carboxyl-containing azonitrile. Step *a* is preferably carried out at moderately elevated temperatures, e. g. on a steam bath. At this temperature (100° C.), the reaction is, in general, essentially complete in six hours. At lower temperatures, e. g. 30° C., longer reaction times are required. Step *b* is conveniently carried out at room temperature, the time of reaction at this temperature (20–30° C.) being in the neighborhood of 12 to 24 hours. Temperatures outside this range, e. g. 10 to 50° C., can be used however. The oxidation step *c* is carried out by introducing chlorine or bromine into a stirred solution of the hydrazo compound at low temperatures, e. g. —5 to 10° C. At higher temperatures the yield of azo compound is poorer, whereas at lower temperatures there is danger that the mixture will freeze. The chlorine or bromine is introduced until absorption thereof ceases. Step *c* also converts the alkali salt of the carboxyl groups present in the azo compound to the free carboxyl groups. The carboxyl-containing azonitrile can be purified by crystallization or by conversion into a more soluble salt followed by precipitation as the free acid from an aqueous solution of the salt.

The azonitriles of this invention are of utility as catalysts for chain reactions, e. g. chlorination, and chlorosulfonation, and particularly polymerization catalysts in the addition polymerization, including copolymerization, of polymerizable compounds containing ethylenic double bonds. Numerous compounds of this type are known in the art. Examples include monoolefins, such as ethylene, isobutylene and styrene; diolefins, particularly butadiene; vinyl esters, e. g. vinyl chloride, vinyl fluoride, vinyl acetate, vinyl propionate; vinylidine halides, e. g. vinylidene chloride and fluoride; vinyl ethers and ketones, e. g. vinyl butyl ether and methyl vinyl ketone; acrylyl and methacrylyl compounds, e. g. acrylonitrile, methyl methacrylate, and methacrylamide; polyfluoroolefins, e. g. tetrafluoroethylene, trifluorochloroethylene and 1,1 - difluoro - 2,2 - dichloroethylene; and compounds containing two or more isolated or conjugated double bonds, e. g. the diacrylic acid esters of glycols and polyethylene glycols, for example, tetraethylene glycol dimethacrylate, diallyl diglycolate, diallyl carbonate, diallyl phthalate, ethylene bis-(allyl maleate), chloroprene, and fluoroprene. A particularly important group, to which the majority of the above polymerizable compounds belong, is that of polymerizable compounds having a $CH_2=C=$ group.

The amount of the azonitrile to be employed varies between 0.001 and 5% based on the weight of polymerizable compounds present although usually between 0.1 and 3% is used. The temperature usually employed is 20–125° C. or higher. Lower temperatures can be used when light is employed in conjunction with the azonitrile. The polymerization can be carried out in bulk or emulsion systems. The water-soluble character of salts of the azonitriles of this invention permit them to be used with particular advantage in water systems.

In addition to the use of the azonitriles of this invention as polymerization catalysts, decomposition of the azonitriles by heating until nitrogen is evolved produces the corresponding dinitriles in which the nitrile groups are attached to adjacent carbons. Such dinitriles may be used as intermediates in organic reactions.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An azo compound of the formula

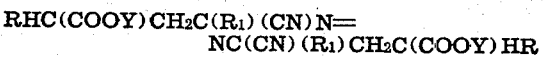

where Y is a monovalent cation, $R_1$ is a hydrocarbon radical of 1–6 carbons, and R is a member of the class consisting of hydrogen and hydrocarbon radicals of 1–6 carbons.

2. An azo compound of the formula

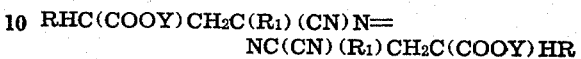

where Y is a monovalent cation, $R_1$ is an organic radical of 1 to 6 carbons and R is a hydrocarbon radical of one to six carbons.

3. A compound

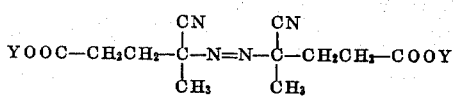

where Y is a monovalent cation.

4.

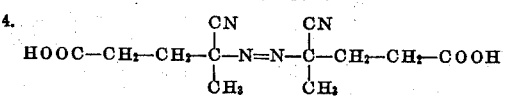

JAMES A. ROBERTSON.

REFERENCES CITED

The following references are of record in the file of this patent:

Beilstein, 4th edition, vol. 4, 1st Suppl., page 566.

Beilstein, 4th edition, vol. 4, page 563.

Annalen der Chemie, vol. 290, pages 1 to 40 (1896).